US012561778B2

(12) United States Patent
Inoue et al.

(10) Patent No.: US 12,561,778 B2
(45) Date of Patent: Feb. 24, 2026

(54) SALIENCY ANALYSIS SYSTEM, SALIENCY ANALYSIS METHOD AND RECORDING MEDIUM

(71) Applicant: Konica Minolta, Inc., Tokyo (JP)

(72) Inventors: Satoru Inoue, Kunitachi (JP); Shoichi Uratani, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 329 days.

(21) Appl. No.: 18/320,292

(22) Filed: May 19, 2023

(65) Prior Publication Data

US 2023/0386005 A1 Nov. 30, 2023

(30) Foreign Application Priority Data

May 31, 2022 (JP) .................................. 2022-088856
Mar. 6, 2023 (JP) .................................. 2023-033855

(51) Int. Cl.
*G06T 7/246* (2017.01)
*G06T 7/00* (2017.01)

(52) U.S. Cl.
CPC ............ *G06T 7/0002* (2013.01); *G06T 7/246* (2017.01); *G06T 2207/10024* (2013.01); *G06T 2207/20076* (2013.01); *G06T 2207/30168* (2013.01)

(58) Field of Classification Search
CPC .................. G06T 7/0002; G06T 7/246; G06T 2207/10024; G06T 2207/20076; G06T 2207/30168; G06V 30/18143; G06V 10/44; G06V 10/462; G06V 10/25
See application file for complete search history.

(56) References Cited

U.S. PATENT DOCUMENTS

| | | | | |
|---|---|---|---|---|
| 2016/0078631 A1* | 3/2016 | Takahashi | .............. | G06V 20/63 382/164 |
| 2017/0372162 A1* | 12/2017 | Wang | ........................ | G06T 7/11 |
| 2020/0012887 A1* | 1/2020 | Li | ........................ | G06F 18/2415 |
| 2021/0056663 A1* | 2/2021 | Zhang | ..................... | G06T 11/60 |
| 2021/0357644 A1* | 11/2021 | Jain | ..................... | G06V 10/764 |

FOREIGN PATENT DOCUMENTS

| | | | |
|---|---|---|---|
| AU | 2012268887 A1 * | 7/2014 | |
| JP | 6495254 B2 | 4/2019 | |

OTHER PUBLICATIONS

EPO Extended European Search Report for corresponding EP Application No. 23175361.7; Dated on Aug. 28, 2023.
Li Jian et al, "Webpage saliency prediction with multi-features fusion," 2016 IEEE International Conference on Image Processing (ICIP), IEEE, Sep. 25, 2016 (Sep. 25, 2016), pp. 674-678 (XP033016613, DOI: 10.1109/ICIP.2016.7532442).

* cited by examiner

*Primary Examiner* — Syed Haider
(74) *Attorney, Agent, or Firm* — CANTOR COLBURN LLP

(57) ABSTRACT

A saliency analysis system includes: an input receiver that receives an evaluation target image; and a hardware processor, wherein the hardware processor extracts low-order image feature amounts and high-order image feature amounts, from the evaluation target image, and calculates saliencies in the image, based on the low-order image feature amounts and the high-order image feature amounts.

14 Claims, 12 Drawing Sheets

Imo1

← LINE-OF-SIGHT        LINE-OF-SIGHT        →
  CONCENTRATION: LOW    CONCENTRATION: HIGH

Imo2

← LINE-OF-SIGHT        LINE-OF-SIGHT        →
  CONCENTRATION: LOW    CONCENTRATION: HIGH

Imo3

← LINE-OF-SIGHT        LINE-OF-SIGHT        →
  CONCENTRATION: LOW    CONCENTRATION: HIGH

FIG.6

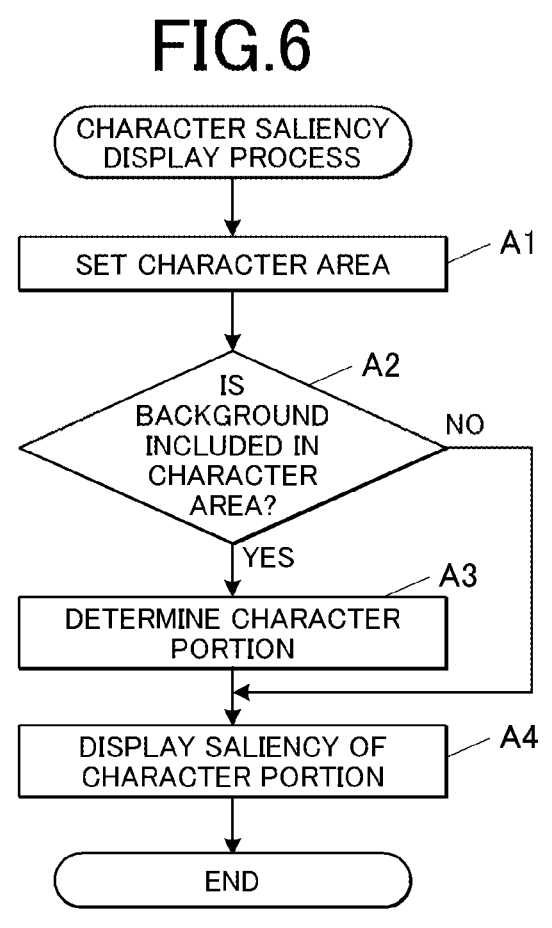

```
        ┌─────────────────────┐
        │ CHARACTER SALIENCY  │
        │  DISPLAY PROCESS    │
        └─────────────────────┘
                  │
                  ▼
        ┌─────────────────────┐    A1
        │  SET CHARACTER AREA │
        └─────────────────────┘
                  │
                  ▼                 A2
              ╱╲
            ╱    ╲
          ╱   IS   ╲
        ╱ BACKGROUND ╲    NO
       ╱ INCLUDED IN  ╲──────┐
        ╲ CHARACTER   ╱      │
          ╲ AREA?   ╱        │
            ╲    ╱           │
              ╲╱             │
               │ YES         │
               ▼       A3     │
        ┌─────────────────────┐
        │ DETERMINE CHARACTER │
        │      PORTION        │
        └─────────────────────┘
                  │           │
                  ▼◄──────────┘
        ┌─────────────────────┐    A4
        │ DISPLAY SALIENCY OF │
        │  CHARACTER PORTION  │
        └─────────────────────┘
                  │
                  ▼
        ┌─────────────────────┐
        │         END         │
        └─────────────────────┘
```

```
LINE-OF-SIGHT PREDICTION
OUTPUT PROCESS
        │
        ▼
GENERATE PROBABILITY DISTRIBUTION     B1
WHERE LINE OF SIGHT IS PLACED
        │
        ▼
GENERATE PROBABILITY DISTRIBUTION     B2
WHERE LINE OF SIGHT IS NOT PLACED
        │
        ▼
CORRECT PROBABILITY DISTRIBUTION      B3
WHERE LINE OF SIGHT IS PLACED
        │
        ▼
OUTPUT LINE-OF-SIGHT PREDICTION       B4
RESULT
        │
        ▼
      END
```

SALIENCY ANALYSIS SYSTEM, SALIENCY ANALYSIS METHOD AND RECORDING MEDIUM

CROSS REFERENCE TO RELATED APPLICATIONS

The present invention claims priority under 35 U.S.C. § 119 to Japanese Patent Application No. 2022-088856, filed on May 31, 2022, and Japanese Patent Application No. 2023-033855 filed on Mar. 6, 2023, the entire contents of which being incorporated herein by reference.

TECHNICAL FIELD

The present invention relates to a saliency analysis system, a saliency analysis method, and a recording medium.

DESCRIPTION OF THE RELATED ART

Conventionally, a bottom-up type evaluation method based on low-order image feature amounts, such as contrasts of a color, luminance, and bearing has been known as saliency evaluation. A top-down type approach that adopts line-of-sight data obtained by eye tracking or the like as training data and predicts the line of sight through deep learning has been known.

For example, JP 6495254B describes a method where a computer receives a visual representation of a scene, and receives area selection data indicating at least one selected area in the scene, and a processor applies a visual attention model to the visual representation, and determines visual conspicuity in at least one selected area, the processor calculates feature-related data associated with a plurality of visual features associated with at least one selected area, and the processor evaluates a feature impact where at least one of the visual features in at least one selected area affects the visual conspicuity, based on the visual conspicuity and the feature-related data.

SUMMARY OF THE INVENTION

However, in the case of the bottom-up type approach based on low-order image feature amounts, saliencies at portions of attracting attention and portions of tending to be watched in a design (image etc.) are expected to be evaluated, but the line-of-sight predictability on how the line of sight is guided in information processing (recognition process) in an initial stage of recognition of a target cannot sufficiently be analyzed.

In the case of the approach through deep learning having conventionally been used for the line-of-sight predictability, a designer (creator) who creates a design can know a result of where the line of sight is guided but cannot understand which factor (image feature amount) guides the line of sight. Accordingly, there is a problem that it is difficult to know the directionality of improvement, in which change is made to improve the saliency and noticeability of a design, from an evaluation result of saliencies based on deep learning.

The present invention has been made in view of the problem in the conventional art described above and has an object to provide a saliency analysis system, a saliency analysis method, and a program that can obtain an evaluation result having a high description accuracy about saliencies, and provide an evaluation result easily understandable for a person intending to obtain saliency evaluation.

To achieve at least one of the abovementioned objects, according to an aspect of the present invention, a saliency analysis system reflecting one aspect of the present invention includes, an input receiver that receives an evaluation target image, and a hardware processor, wherein the hardware processor extracts low-order image feature amounts and high-order image feature amounts, from the evaluation target image, and calculates saliencies in the image, based on the low-order image feature amounts and the high-order image feature amounts.

According to another aspect, a saliency analysis method, includes: extracting low-order image feature amounts and high-order image feature amounts, from an input evaluation target image, and calculating saliencies in the image, based on the low-order image feature amounts and the high-order image feature amounts.

According to another aspect, a non-transitory computer-readable recording medium includes a program causing a computer to achieve: extracting low-order image feature amounts and high-order image feature amounts, from an input evaluation target image; and calculating saliencies in the image, based on the low-order image feature amounts and the high-order image feature amounts.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein:

FIG. 6 is a flowchart showing a flow of a character saliency display process.

DETAILED DESCRIPTION

Figure 1:
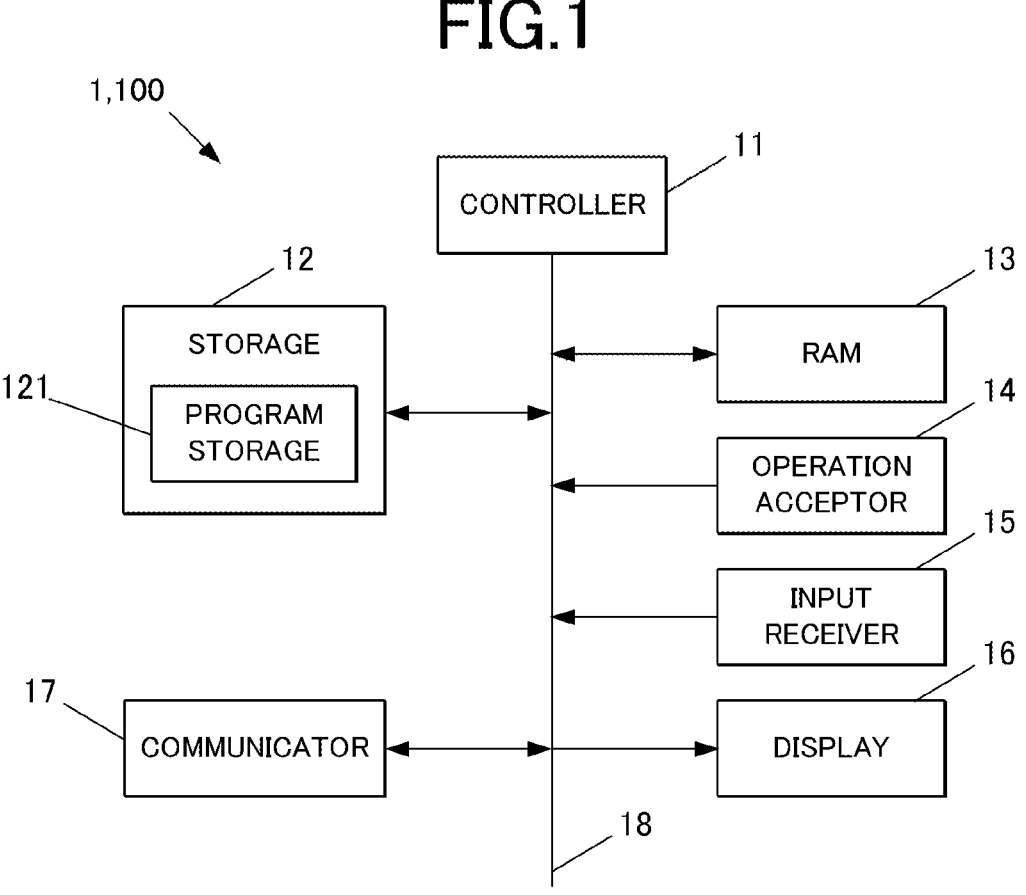
FIG. 1 is a principal block diagram showing a functional configuration of an information processing apparatus included in a saliency analysis system according to this embodiment.

Referring to FIG. 1 to FIG. 11, embodiments of a saliency analysis system, a saliency analysis method, and a program according to the present invention are described.

The saliency analysis system 100 (see FIG. 1) can indicate an analysis result about the saliencies when an evaluator (user or the like) wishes to know whether a portion intended to be made particularly visually salient in a certain image ("evaluation target image" described later) is successfully salient (which is called "saliency is present") or not and how the portion concerned is made more salient. For example, a designer (creator) or the like who proposes a design of a poster, bookbinding, various layouts, a client or the like who places an order of a design for such a designer (creator) is assumed as the evaluator (user or the like).

Note that various limitations technically preferable to implement the present invention are imposed on an embodiment described below, but do not limit the scope of the invention to the following embodiment and examples shown in the drawings.

According to the following embodiment, a case where the saliency analysis system is made up of a single information processing apparatus is described as an example. Alternatively, the saliency analysis system may be made up of multiple information processing apparatuses cooperating with each other.

[Entire Configuration]

FIG. 1 is a principal block diagram showing a functional configuration of the saliency analysis system (an information processing apparatus constituting the saliency analysis system) according to this embodiment.

The information processing apparatus 1, which constitutes the saliency analysis system 100 of this embodiment, is a typical computer (PC), for example.

As shown in FIG. 1, the information processing apparatus 1 includes an operation acceptor 14, an input receiver 15, a display 16, a communicator 17, and a controller 11 (hardware processor) that includes, for example, a CPU (central processing unit), a storage 12, and a RAM (random access memory) 13, and these components are connected by a bus 18.

The operation acceptor 14 accepts an input operation from the outside, generates an input signal in accordance with the input operation, and outputs the input signal to the controller 11. The operation acceptor 14 includes, for example, a keyboard, and any of various pointing devices, such as a mouse. The operation acceptor 14 may include various switching elements, such as a power supply switch and a reset switch. In addition to or instead of these elements, a touch panel or the like positioned so as to be overlaid on a display screen of the display 16.

The input receiver 15 is an obtainer that obtains image data (hereinafter also called "evaluation target image") serving as a saliency analysis target (evaluation target) from an external apparatus or the like (e.g., a dedicated terminal or the like used to create a design) (inputs the data into the saliency analysis system 100).

The input receiver 15 is made up of a network interface, for example, and is configured to receive data from external equipment connected in a wired or wireless manner through a communication network. Note that the input receiver 15 is not limited to what is made up of a network interface or the like and may be made up of a port or the like into which a USB memory, an SD card or the like is inserted and allows image data to be captured.

The display 16 includes a display screen included in a monitor, such as a liquid crystal display (LCD), for example. A touch panel that functions as the operation acceptor 14 may be integrally formed on the display screen.

The display 16 performs a display operation on the display screen in accordance with control by the controller 11. Specifically, based on a display signal input from the controller 11, various images and the like (e.g., an evaluation target image, a saliency analysis result, etc.) are displayed on the display screen.

Note that the number of displays 16 provided for the saliency analysis system 100 (the information processing apparatus 1 constituting the saliency analysis system 100) is not limited to one. For example, a plurality of monitors may be provided.

The communicator 17 controls transmission and reception of data between the information processing apparatus 1 and the outside in conformity with a predetermined communication standard. Although not particularly limited, the communication standard is, for example, TCP/IP or the like pertaining to a LAN (local area network). Additionally, or alternatively, the communicator 17 may be what can perform communication control pertaining to wireless communication, such as of WiFi. Furthermore, the communicator 17 may include a driver that controls one-to-one communication, such as USB (universal serial bus).

The controller 11 is a hardware processor that performs various operation processes, and controls operation of the information processing apparatus 1 in an integrated manner. The controller 11 may be made up of a single CPU, or multiple CPUs that perform operation processes in parallel. Alternatively, multiple CPUs may be separately assigned in accordance with functions, and independently perform operations.

The storage 12 is a nonvolatile storage medium and may thus be, for example, a flash memory, an HDD (hard disk drive) or the like. The storage 12 includes a program storage area 121 that stores programs to be executed by the controller 11. The storage 12 stores various setting data items required by the controller 11 executing various processes.

The storage 12 is not limited to what is internally included in the information processing apparatus 1 and may be an external apparatus instead. The storage 12 may be what is positioned on a network, for instance, a cloud server.

The RAM 13 provides the controller 11 with a working memory space, and temporarily stores data. The RAM 13 is, for example, DRAM, and can read and write a large amount of data at high speed. Temporal data to be stored may include image data (the evaluation target image) obtained through the input receiver 15, the communicator 17 and the like.

Note that the information processing apparatus 1 may include no operation acceptor 14 and/or no display 16 and accept an input operation (command) and transmit display data through access from the outside via the communicator 17.

It is herein described that the single information processing apparatus 1 performs all the processes. Alternatively, a saliency analysis system may be adopted where the controller 11 may be arranged in multiple computers in a distributed manner and execute each of the processes while appropriately transmitting and receiving data.

Here, the details of functions of the controller 11 are described.

The CPU reads various processing programs stored in the program storage area 121 of the storage 12, loads the programs into the RAM 13, and executes various processes according to the programs. In the present embodiment, the controller 11 achieves various functions as below through cooperation with the programs.

That is, the controller 11 functions as a feature amount extractor, and a calculator. In this embodiment, the controller 11 functions also as an area setter, a determiner and an improvement proposer.

The controller 11 as the feature amount extractor extracts low-order image feature amounts, and high-order image feature amounts from "evaluation target image" input into the saliency analysis system 100 (information processing apparatus 1) through the input receiver 15.

Note that a specific method by the controller 11 as the feature amount extractor extracting low-order image feature amounts, and high-order image feature amounts, from "evaluation target image" input through the input receiver 15 is described later.

Here, the "low-order image feature amount" is a physical image feature amount that includes, for example, the color, luminance, bearing (the direction and shape of an edge), and is a component for guiding the line of sight of a person to be concentrated extrinsically and passively. In this embodiment, the "low-order image feature amount" is a concept widely encompassing at least any of the color and luminance distribution, contrast, face, font, and motion.

The impact on a person viewing an image, and the degree of visual fixation (conspicuity and saliency) varies depending on elements that include the color (e.g., complementary color difference) used for each of portions constituting an image, each partial distribution of brightness (luminance), bearing (direction), and contrast.

For example, the line of sight tends to be concentrated on a portion having a large complementary color difference (e.g., portions at boundaries between red and green and between blue and yellow), and the saliency tends to be high. For example, in a case where the entire arrangement is in a certain direction and an object arranged in a direction (edge direction) different from the direction is present, the line of sight tends to be concentrated on the portion. Furthermore, in a case where a portion recognized as a face is present in the image, in general the portion tends to be watched. In a case where some of elements constituting the image are characters, the degree of visual fixation varies depending also on the font type and size. The font involves characters with specific typefaces. There are fonts with various typefaces, such as print letters, block letters, and cursive letters. The degree of visual fixation sometimes varies depending on the type of the font in representation. Even with the same typeface, a larger character tends to attract attention than a smaller character.

Furthermore, "evaluation target image" is not limited to a still image and may be a moving image. In a case where "evaluation target image" is a moving image, various motions (movement and exercise) in the image also affects the degree of visual fixation. For example, in a case where in an image entirely moving in a certain direction at a substantially constant velocity, an object moving at a different velocity at a certain location is present, and in a case where an object moving in a direction different from others, the line of sight tends to be concentrated at the portion.

The "high-order image feature amount" is a physiological and spiritual image feature amount in which memory, experience, knowledge, and the like of a person are reflected, and is a component for guiding the line of sight of the person to be concentrated intrinsically and actively. More specifically, the component is derived from human spiritual and psychological tendencies, the line-of-sight movement tendency, and the like that are regarded to affect the impact on a person viewing an image, and the degree of visual fixation (conspicuity and saliency). In this embodiment, the high-order image feature amount includes at least any of the position bias, and the processing fluency.

For example, the position bias is a concept that accommodates, as line-of-sight movement tendencies: "center bias" where the line of sight tends to be concentrated on an object at the center of an image; a tendency that the line of sight tends to move from the top left to the bottom right of the image, and the line of sight tends to be concentrated on the top left on, for example, a magazine, a webpage, and the like; a tendency where when a vertically written document is viewed, the line of sight tends to move from the top right to the bottom left, and the line of sight tends to be concentrated at the top right; and further, for example, a tendency where the line of sight tends to be concentrated at a portion close to the height of the eye level in a layout in a store, assuming a case in the store, such as a supermarket. The position bias affects the degree of visual fixation (conspicuity, and saliency) of a person viewing an image or the like.

The processing fluency indicates that in general it is easy for a person to process what is simple and easily recognizable and is difficult to process what is complicated and is difficult to understand. In this embodiment, the processing fluency affects the degree of visual fixation (conspicuity and saliency) in a sense where the line of sight tends to be placed and fixed at a portion that is easily recognizable and has a high processing fluency in the image, and the line of sight is less likely to be fixed at a portion that is difficult to be recognized and has a low processing fluency.

In this embodiment, the degree of the processing fluency includes what is determined by at least one of the complexity, design density, and spatial frequency.

That is, a portion difficult to be recognized is a random and complex portion, that is, a portion that has a congested design and the like and is difficult to be understand. At a location and the like where the design and the like are randomly congested, an abrupt change, such as an edge, occurs in the image, and the spatial frequency is high at such a location. At a portion having a too high complexity, design density and spatial frequency, the processing fluency is low.

On the other hand, also at a portion having a too low complexity, design density and spatial frequency, i.e., an area including no information, it is difficult to read information, and perform processing, and the line of sight does not tend to be fixed.

Figure 2A:
FIG. 2A shows an example of an evaluation target image.

For example, in an image Imo shown in FIG. 2A, the line of sight is frequently concentrated on an edge portion of a smartphone placed on a notebook at an angle different from that of the notebook, the notebook being placed on a left of the image, and an edge portion of a notebook personal computer placed on a right side of the image, a plant disposed between the notebook and the notebook personal computer, and the like.

The controller 11 as the calculator calculates saliencies in the image, based on the low-order image feature amounts, and the high-order image feature amounts.

Note that a specific method by the controller 11, as the calculator, calculating saliencies, based on the low-order image feature amounts, and the high-order image feature amounts is described later.

In this embodiment, in the "evaluation target image" (image Imo), an area where the saliency degree is determined is set, and the saliency can be determined in the set area (this is called "determination area").

The controller 11 as the area setter sets a "determination area" in the "evaluation target image".

In this embodiment, the "determination area" set by the controller 11 as the area setter is designated freely by the evaluator (user or the like).

Designation by the evaluator (user or the like) about a freely selected area Art where the saliency degree is intended to be determined is performed by an input operation or the like from the operation acceptor 14, for example.

For example, in FIG. 2A, the image where the notebook is arranged on the left side of the screen, the notebook personal computer is arranged on the right side of the screen, the plant is arranged between the notebook and the notebook personal computer, and stationary, such as a pen, is placed on the right side of the notebook personal computer, is shown as an example of the "evaluation target image" (image Imo). In the embodiment, a case is exemplified where the evaluator (user or the like) designates an area from a screen of the notebook personal computer to a keyboard as an area Ar1 where the saliency is intended to be determined. Note that in FIG. 2A, the area Ar1 designated by the evaluator (user or the like) is indicated by a surrounding broken white line.

When the freely selected area Art is designated in the "evaluation target image" as described above, the controller 11 as the area setter sets the area as "determination area".

The controller 11 as the determiner determines the contribution to the saliency of each image feature amount in the set "determination area".

The controller 11 as the improvement proposer proposes an improvement about the saliencies in accordance with the value of the image feature amount extracted by the extractor. Note that the details of determination of the contribution in the determiner, and the proposal in the improvement proposer are described later.

[Saliency Analysis Method in Present Embodiment]

In this embodiment, the saliency analysis method extracts low-order image feature amounts, and high-order image feature amounts from "evaluation target image" input from the input receiver 15 (feature amount extracting), and calculates the saliencies in the image, based on the extracted low-order image feature amounts, and high-order image feature amounts (calculating). Specifically, by extracting the image feature amounts, a feature amount map for each image feature amount over the entire "evaluation target image", and a saliency map that represents the degree of line-of-sight fixation indicating the degree and place of line-of-sight concentration in the image, for each image feature amount, based on the feature amount map. Furthermore, each saliency map is multiplied by the value of a weight indicating an effect (contribution) by each image feature amount affecting the saliencies, then all the saliency maps are integrated, and a saliency map as a whole is generated.

Hereinafter, the saliency map for each image feature amount in the saliency analysis method described above is represented as a feature amount saliency map.

In the saliency analysis method, the controller 11 generates each feature amount saliency map indicating the saliencies in the image calculated by this controller serving as the calculator, based on the image feature amount extracted for the corresponding type of the image feature amount by this controller serving as the feature amount extractor, and generates the saliency map that integrally includes all the feature amount saliency maps. Here, the controller 11 functions as a generator.

Figure 3:
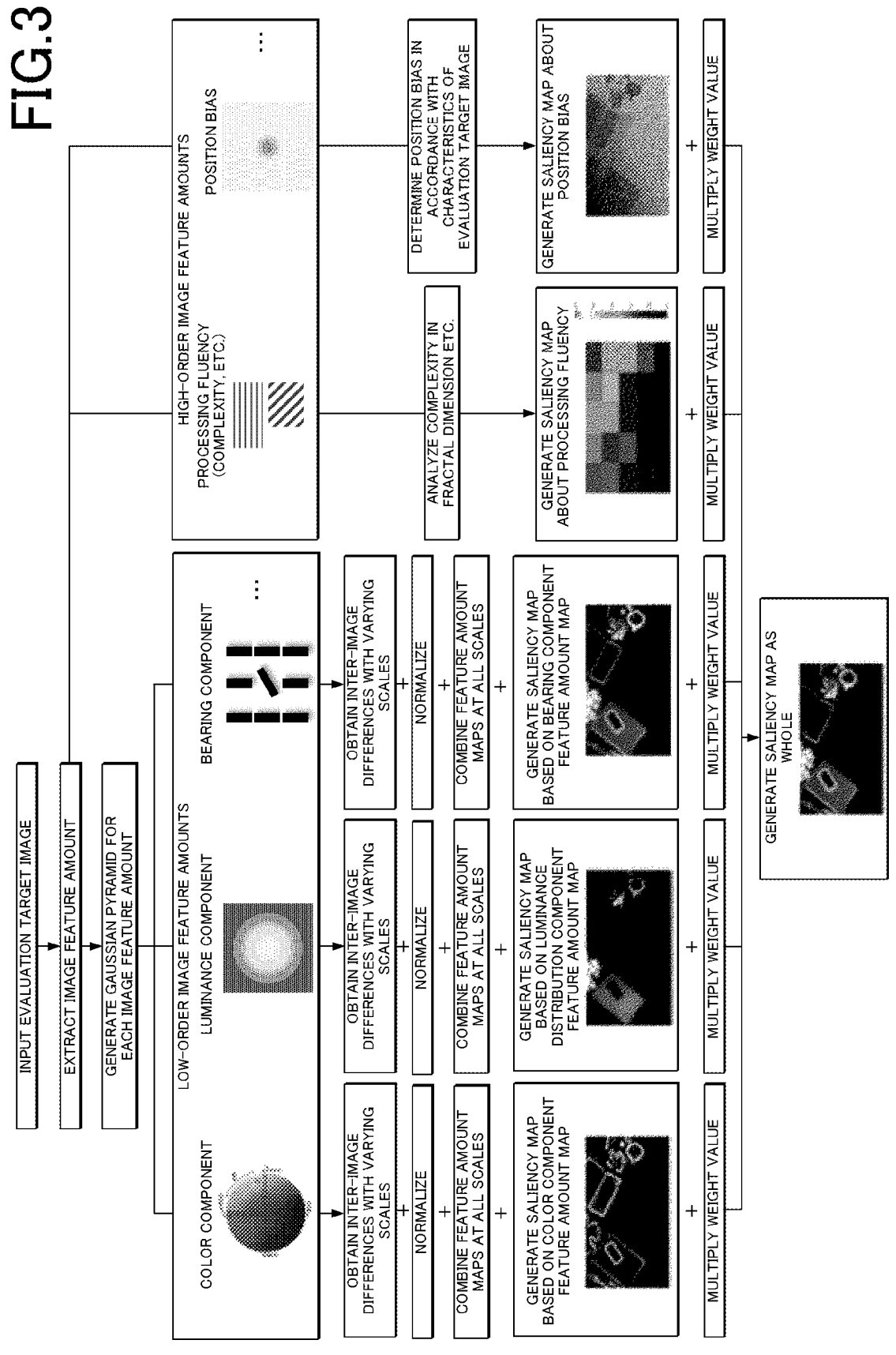
FIG. 3 schematically illustrates a flow of a saliency analysis process for the evaluation target image in this embodiment.

FIG. 3 schematically illustrates a flow of a saliency analysis process in this embodiment.

As shown in FIG. 3, according to the saliency analysis method in this embodiment, an "evaluation target image" is input from the input receiver 15 into the saliency analysis system 100. For example, a designer (creator) inputs an image, such as a poster, made by themself, from a terminal or the like dedicated for design into the saliency analysis system 100 (the information processing apparatus 1 included in the saliency analysis system 100) via a communication network and the like. Here, description is made with an example where for instance, the aforementioned image Imo in FIG. 2A is input as the "evaluation target image".

When the "evaluation target image" is input, the controller 11 serves as the feature amount extractor, and extracts each of low-order and high-order image feature amounts from the "evaluation target image" (the image Imo in FIG. 2A).

The controller 11 applies a blurring process (a process of reducing the resolution of an image) by Gaussian filters to the "evaluation target image" (the image Imo in FIG. 2A). Specifically, a group of images (multiresolution representation of the image; Gaussian pyramid) are generated, for each low-order image feature amount, by gradually applying a plurality of Gaussian filters with varying blurring degrees to the "evaluation target image" (image Imo).

Note that in FIG. 3, the color component, luminance component, and bearing component are exemplified as the low-order image feature amounts. However, as described above, the elements of the low-order image feature amounts are not limited to them. For example, in a case where the image Imo input as the "evaluation target image" is a moving image, an element of a motion (movement) and the like is also included.

After the group of images (Gaussian pyramid) for the respective components of image feature amounts is generated, inter-image differences with varying scales are obtained (calculated) for the respective elements of the image feature amounts, using the multiresolution representation.

In the process of calculating the inter-image difference, the controller 11 calculates at least one of the color difference, and the luminance difference based on the L*a*b* color space obtained by conversion from RGB data. The L*a*b* color space is more suitable for the human sensation of color difference than the RGB color space. Accordingly, by calculating at least one of the color difference, and the luminance difference, based on the L*a*b* color space, the following advantageous effect can be achieved. Specifically, the values of luminance contrast and color contrast extracted from the "evaluation target image" can be represented using the brightness difference, or the color difference, which is suitable for the human sensation. Consequently, the saliencies indicated by the finally obtained saliency map can finely match the human sensation.

After a difference image is obtained, the controller 11 normalizes the image, combines the feature amount maps at all the scales with respect to each component of the image feature amount, and generates the saliency map in accordance with the feature amount map.

For example, as shown in FIG. 3, the saliency map in view of each low-order image feature amount is a saliency map indicating a high saliency at a portion with large color contrast (complementary color difference) in the case of the color component, and is represented as a map where for example, a portion of a boundary between a black screen portion, and a white portion of the notebook personal computer has a large saliency in the case of the luminance component. In the case of the bearing component, portions where edges of the notebook, and the notebook personal computer reside are indicated as portions having a large saliencies.

For calculation of the saliencies in the image based on the low-order and high-order image feature amounts extracted by the feature amount extracting, the controller 11 executes the following processes, in calculating. Specifically, when a transparent area resides in the "evaluation target image", the controller 11 sets a predetermined gradation in the transparent area and calculates saliencies.

Accordingly, even when a transparent area is included in the "evaluation target image", appropriate saliencies can be calculated.

In this embodiment, the processing fluency (complexity etc.), and the position bias are extracted as high-order image feature amounts by the controller 11 serving as the feature amount extractor (see FIG. 3).

Here, the processing fluency (complexity etc.), and the position bias are exemplified as high-order image feature amounts. However, as described above, the high-order image feature amounts are not limited to them. Various elements (components) other than them can be included.

As described above, the processing fluency can be measured by the degree of complexity and can be analyzed and quantified by a method of the fractal dimension, for example. That is, the "evaluation target image" (image Imo) is divided into multiple meshes, analysis is performed to find portions with a dense dot-represented configuration, and portions with a sparse configuration. As a result, a portion in a high fractal dimension (e.g., 1.8) is evaluated as a complex and random portion, and a portion in a low fractal dimension (e.g., 1.2) is evaluated as a simple portion having a small amount of information.

For example, in a case of an image shown in FIG. 2A, a background portion on which nothing is placed is evaluated to have a low fractal dimension, and a portion on the right side of the notebook personal computer with the stationary randomly placed has a high fractal dimension. The controller 11 generates the saliency map, based on the degree of complexity (processing fluency) quantified as described above.

As described above, the background portion with little information has a low fractal dimension, is a portion less likely to attract attention, and has a low saliency. Consequently, the saliency map about the processing fluency (complexity) is a map where the background portion with little information, and very complex portions are evaluated to have low saliencies, and portions having an appropriate complexity are evaluated to have the highest saliency.

Furthermore, in accordance with the characteristics and type of the image Imo input as the "evaluation target image" (for example, whether the image is an image having a purpose of being published on a book or posted on a webpage, or an image to be inserted into a vertically written document), the controller 11 generates the saliency map of the position bias depending on the place and the direction where the line of sight tends to be guided in consideration of human psychological characteristics.

For example, in a case where the image Imo input as the "evaluation target image" is posted on a webpage, the map indicates that the saliency at the top left of the image is high, and the saliency at the bottom right is low.

After the saliency maps are generated respectively for the low-order and high-order image feature amounts, the controller 11 integrates the saliency maps, and performs calculation about where the line of sight is placed as a whole when a person watches the "evaluation target image", and which portion has high degrees of visual fixation and line-of-sight fixation.

Note that the weights for the respective image feature amounts (the effects and contributions to the degrees of visual fixation and line-of-sight fixation) are not uniform and include elements (components) that largely affect the degrees of visual fixation and line-of-sight fixation, and elements (components) that less likely affect them. Accordingly, in this embodiment, the values of weights are set for the respective image feature amounts, and the saliency map are multiplied by the respective values and then added up together.

For example, in a case where the degree of effect (contribution) that affects the degrees of visual fixation and line-of-sight fixation about the color component and the bearing component is "5", the degrees of visual fixation and line-of-sight fixation about the luminance component is about "1", and the degrees of visual fixation and line-of-sight fixation about the processing fluency and the position bias is about "2", the saliency maps calculated for the respective image feature amounts are multiplied by the corresponding values of the degrees of effects (contributions), and then integrated.

As for the values of weights by which the saliency maps of the image feature amounts are multiplied, for example, values of the respective degrees of effects (contributions) in accordance with typically conceived degrees are set as defaults and stored in the storage 12 or the like. Note that setting of the value of the weights may be appropriately changed in conformity with the purpose and the like by a person (evaluator) who evaluates the saliencies for the "evaluation target image".

For example, in cases of elderly people, they relatively tend to have difficulty in viewing an edge. Accordingly, for saliency evaluation of designs used for the layout of a place used for elderly people, webpages, books and the like for elderly people, adjustment of setting the value of the weight of the bearing component (edge component) to be low may be appropriately performed.

Accordingly, for the current "evaluation target image" (image Imo), the saliency as a whole indicating the location and the degrees of visual and line-of-sight concentration can be presented for the evaluator and the like.

The saliency presentation method is not specifically limited. For example, the saliency map itself as shown in FIG. 3 may be displayed on the display 16 or the like, or the saliency of each portion may be represented as a numeral or the like. The contribution of each image feature amount indicating which image feature amount contributes to the saliency may be represented as a numeral or the like. The way of presentation, and the way of outputting the saliencies are not limited to displaying on the display 16. For example, audio output or the like may be performed. Alternatively, output may be made through printing or the like. An analysis result may be transmitted from the information processing apparatus 1 to an external apparatus.

As described above, in this embodiment, when the evaluator freely sets an area for which saliency evaluation is specifically intended to be known, the controller 11 sets this area Art as a "determination area". The saliency evaluation is not necessarily performed for the entire image and may be performed for the set "determination area".

For example, in a case where the area Art from the screen of the notebook personal computer to the keyboard is set as the "determination area" as indicated by the surrounding broken white line in FIG. 2A, the saliency is determined for this "determination area".

Figure 2B:
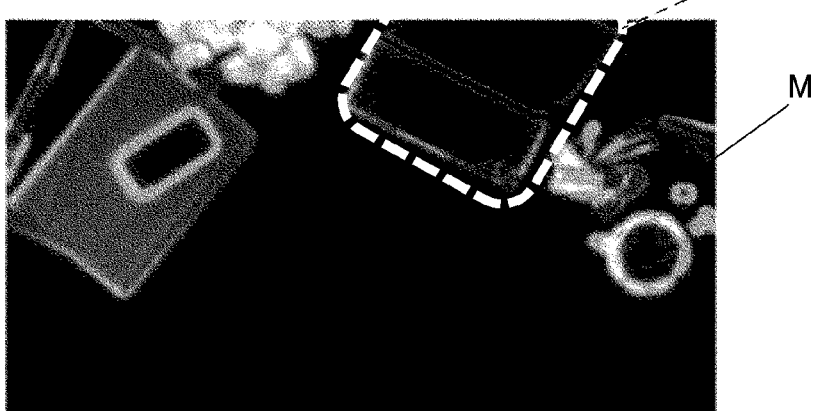
FIG. 2B shows an example of a saliency map.

Note that FIG. 2A shows the example where the freely selected area Ar1 is designated for the original "evaluation target image" (image Imo), and this area Art is set as the "determination area". The area Art may be designated after the saliencies are determined for the entire "evaluation target image" (image Imo), and a saliency map M as shown in FIG. 2B is generated (for example, indicated by the surrounding white broken line in FIG. 2B).

After the "determination area" is set, the controller 11 as the determiner determines the saliencies indicating the degree of saliency of the set "determination area" in the entire image, and the concentration degree of the line of sight, and determines the degree of the contribution of the image feature amounts in the "determination area" to the saliencies.

That is, in the above example, the degree of line-of-sight concentration of the area Ar1 from the screen of the notebook personal computer to the keyboard, in the entire image, and which image feature amount about which the line of sight is regarded to be concentrated or not to be concentrated, are determined. A determination result is presented to the evaluator by displaying the numerical value indicating the saliency level, the contribution of each feature amount to the saliencies, and the like, on the display 16 or the like.

For example, in the current situations, when the "determination area" is not so salient in the entire image, it is displayed on the display 16 that the contribution of each component to the evaluation as a non-salient state is due to the color, contrast or the like. For example, the largest three among elements (components) having a high contribution to the saliency is displayed, or indicated by numerical values.

The controller 11 serves as the improvement proposer and proposes an improvement about the saliencies in accordance with the value of the image feature amount.

Figure 2C:
FIG. 2C shows an improvement proposal example.
Figure 2D:
FIG. 2D shows an improvement proposal example.

For example, in the current situations, in a case where the "determination area" is not salient, and the luminance distribution and the contrast among the image feature amounts are determined to largely contribute to the current saliencies, the controller 11 displays, on the display 16 or the like, an improved image example Imco1 having an improved contrast between the background portion and the portion of the notebook personal computer, as an improvement plan about the saliencies, as shown in FIG. 2C, for example, thus proposing the plan for the evaluator (designer etc.). For example, in a case where the color among the image feature amounts largely contributes (i.e., a case where a whitish and pale color is determined as a factor of non-saliency of the "determination area"), an improved image example Imco2 where the color is increased to achieve a stronger impact than that in the current situation is displayed as an improvement plan about the saliencies on the display 16 or the like, thus proposing the plan for the evaluator (designer etc.).

Preferably, an area that is inside of the "determination area" and has a high complexity is assumed as an "improvement site area" which has an amount of information and of which the saliency is intended to be improved, and the image feature amount in the "improvement site area" and the amount in areas in the image other than the "determination area" are corrected. Such a configuration can prevent the luminance and color of the background portion from being discontinuous and prevents occurrence of feeling of strangeness.

Here, the luminance, and the color are exemplified. Likewise, an improvement can be proposed also for another image feature amount.

The improvement proposal may be performed for a single image feature amount, or for two or more elements (items) in a combined manner. Multiple patterns for the degree of improvement in saliency by change in an element (component) by a certain way of change may be provided and presented on the display screen or the like of the display 16 in an arranged manner. Preferably, in this case, the changed element, and the degree of change from the original image Imo are indicated as numerical values.

Thus, the evaluator can specifically know that change in an image feature amount by a certain way of change can improve the portion in the "evaluation target image" intended to be salient at a degree of improvement. Accordingly, for example, in a case where the evaluator is a designer, it is easily understandable what is performed to achieve a desired saliency, and an improved design can be easily produced.

Also, in a case where a client requesting production of a design is an evaluator, and a design plan is proposed by a designer or the like, the evaluator can easily point out how the design is changed in order to achieve a design having a desired saliency.

Figure 4:
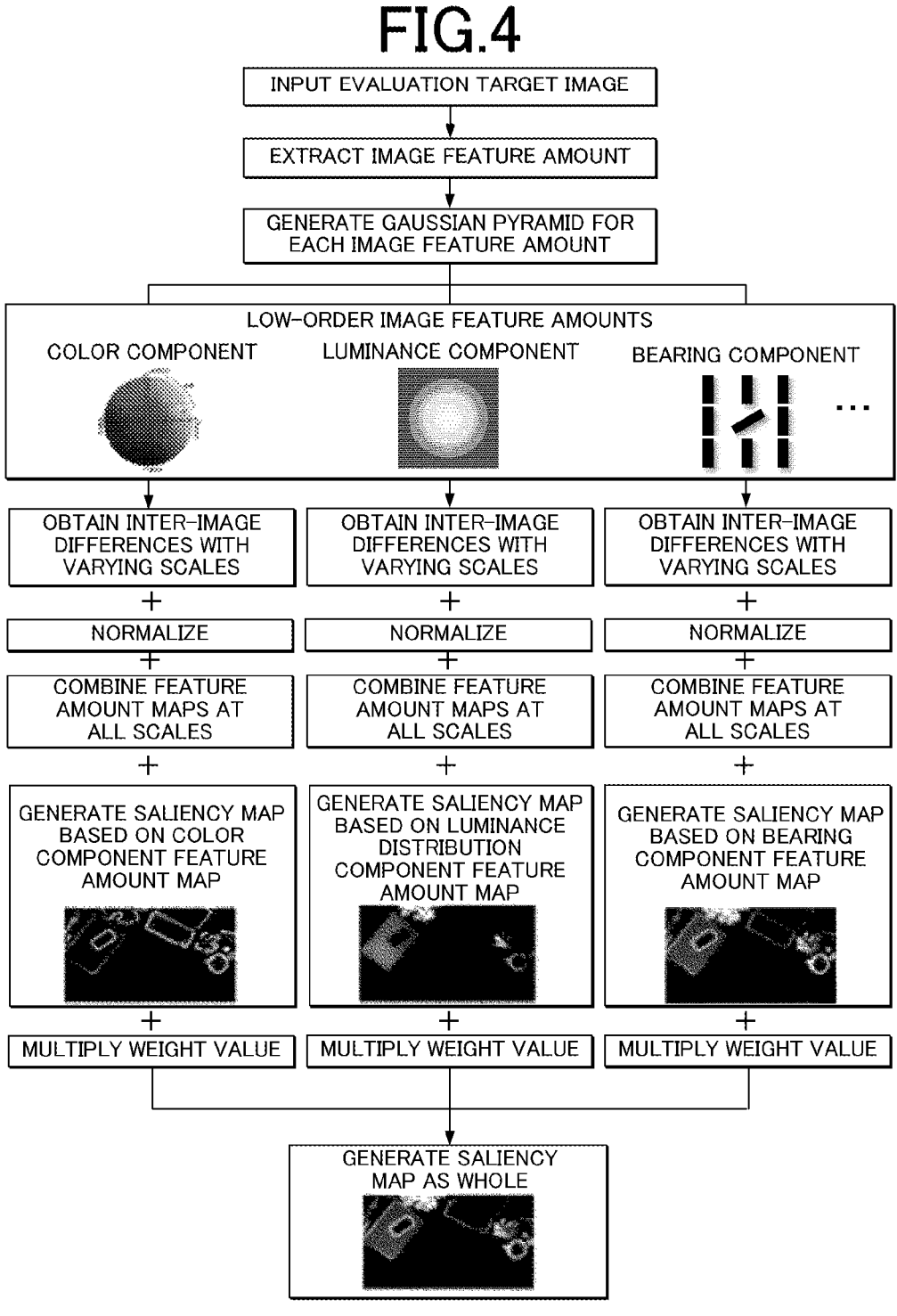
FIG. 4 illustrates a flow of a saliency analysis process for an evaluation target image in a conventional example.

For example, in a conventional example shown in FIG. 4, if the saliency is determined based only on low-order image feature amounts, the way of human psychological line-of-sight concentration, the way of line-of-sight movement, and the like are not reflected in saliency determination, and the saliency cannot correctly be determined.

In a case where information on eye movement (eye tracking information, line-of-sight measurement information) when various types of images are preliminarily visually presented for multiple (n) test subjects is obtained and collected by a dedicated apparatus, the information is accumulated as line-of-sight data in a database, and analyzed by deep learning, possible input of a new image as an "evaluation target image" can obtain prediction information on the line-of-sight data (the saliency about where the line of sight is concentrated in the image).

Figure 5A:
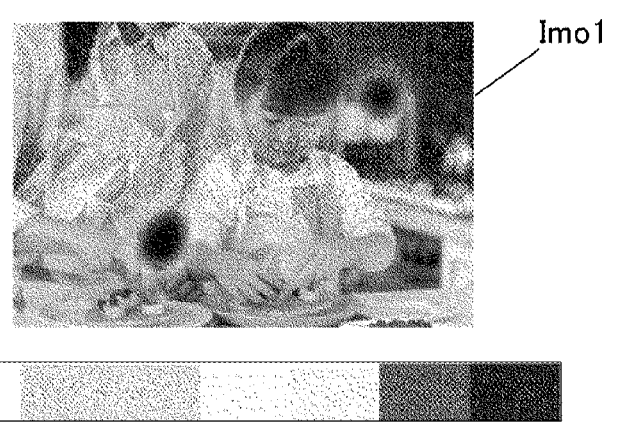
FIG. 5A shows a saliency evaluation example in a case of predicting saliencies, based on line-of-sight prediction in deep learning.
Figure 5B:
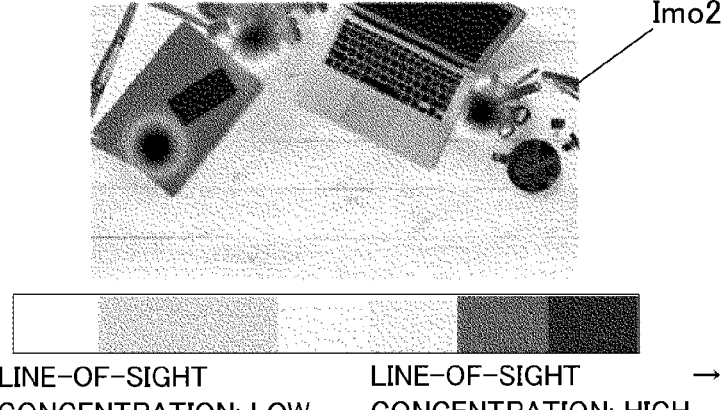
FIG. 5B shows a saliency evaluation example in a case of predicting saliencies, based on line-of-sight prediction in deep learning.
Figure 5C:
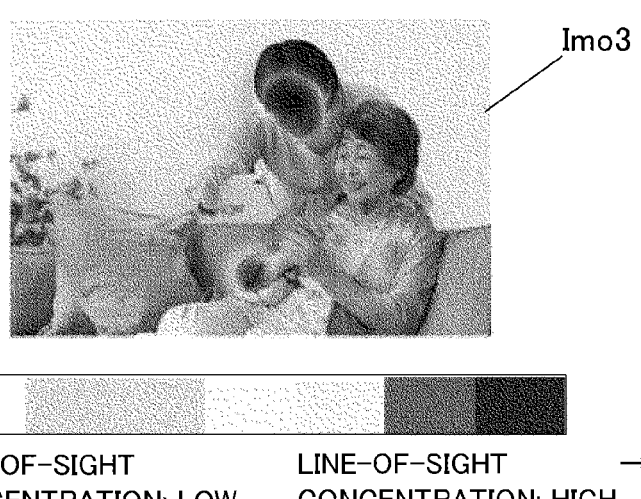
FIG. 5C shows a saliency evaluation example in a case of predicting saliencies, based on line-of-sight prediction in deep learning.

For example, FIG. 5A to FIG. 5C show an example of saliency prediction on the "evaluation target image" using deep learning and show a prediction where the line of sight is frequently concentrated on portions assigned dark-colored circles in the image (i.e., with a high saliency).

However, if the saliency is predicted by deep learning, a prediction result can be presented, but it cannot be presented why the line of sight is determined to be concentrated on the portion concerned. For example, in a case of an image Imo1 shown in FIG. 5A, and a case of an image Imo3 shown in FIG. 5C, it is predicted that the line of sight is concentrated around a face or a distal end of a hand of a person. However, it is unknown that this is because the line of sight is attracted to the hand or the face of the person, or because of the color (complementary color difference), the luminance or the like. In a case of an image Imo2 shown in FIG. 5B, it is predicted that the line of sight is concentrated on the notebook or on the stationery. However, the factor is unknown: it is unknown whether this is because of the color (complementary color difference), of detection as an edge, or of arrangement of the elements, etc. Accordingly, the evaluator (designer etc.) presented with the result cannot know how the design is changed to achieve a more improved saliency at a desired location than in current situations: the way and the directionality of improvement.

On the other hand, in this embodiment, by combining the low-order image feature amounts, and the high-order image feature amounts, the analysis and determination accuracies of saliencies can be improved, and it can be presented how the evaluator (designer etc.) improves the saliency at a desired location: the directionality of improvement, thus allowing sufficient information for supporting the designer and the like to be provided.

[Method of Displaying Saliencies for Characters]

Next, an example is described where saliencies of characters in the "evaluation target image" are displayed.

In a design image, the conspicuous degrees (saliencies) of characters are important. It is demanded to determine whether the characters intended to be appealed in the design image are salient.

In the conventional art, to quantify the saliencies of areas (character areas) where characters are written in the "evaluation target image", a subsequent process is performed, which is inefficient. Specifically, the saliency is calculated for an individual character area manually selected by the user, without generating any saliency map.

On the other hand, in this embodiment, the controller 11 displays the saliency for the characters in the "evaluation target image" by executing a character saliency display process shown in FIG. 6.

(Character Saliency Display Process)

First, the controller 11 sets a character area in the "evaluation target image" as a "determination area" (Step A1). That is, the "determination area" in this embodiment includes what is designated by the controller 11.

Specifically, the controller 11 designates a character area in the "evaluation target image" by AI (artificial intelligence).

Note that the character area in the "evaluation target image" may be designated by the evaluator through an input operation or the like on the operation acceptor 14, for example.

Next, the controller 11 determines whether the "determination area" set in Step A1 includes an area other than that of characters or not, i.e., whether the background of characters is included or not (Step A2).

If the background of characters is included in the "determination area" (Step A2: YES), the controller 11 determines color information in the character portion in color information residing in the "determination area" (Step A3). Accordingly, for example, if the character area is designated by a rectangle, the controller 11 can extract the character portion along the shapes of characters. Thus, the accuracy of displaying the saliencies of characters can be improved.

On the other hand, if the background of characters is not included in the "determination area" (Step A2: NO), the controller 11 proceeds this processing to Step A4.

Next, the controller 11 extracts the saliency of a portion corresponding to the character portion extracted in Step A3, from the saliency map generated by the saliency analysis process described above. The controller 11 then displays the saliency extracted from the saliency map, as the saliency of the characters (Step A4) and finishes this processing.

That is, the controller 11 determines the saliency in the character area in the "evaluation target image", based on the saliency map generated as the generator in the saliency analysis process described above. Here, the controller 11 functions as a first controller.

Note that a case is described where in Step A1 the controller 11 sets a portion other than the character area as a "determination area". In this case, the user may correct the "determination area" by designating the portion other than the character area through the operation acceptor 14. The controller 11 then executes Steps A2 to A4 for the "determination area" corrected by the user.

Note that a case is described where in Step A1 the controller 11 does not set the character area as a "determination area". In this case, the user may correct the "determination area" by designating the character area through the operation acceptor 14. The controller 11 then executes Steps A2 to A4 for the "determination area" corrected by the user.

Figure 7A:
FIG. 7A shows an example of the evaluation target image.
Figure 7B:
FIG. 7B shows an example of an image where a saliency map is displayed on the evaluation target image in an overlaid manner.
Figure 7C:
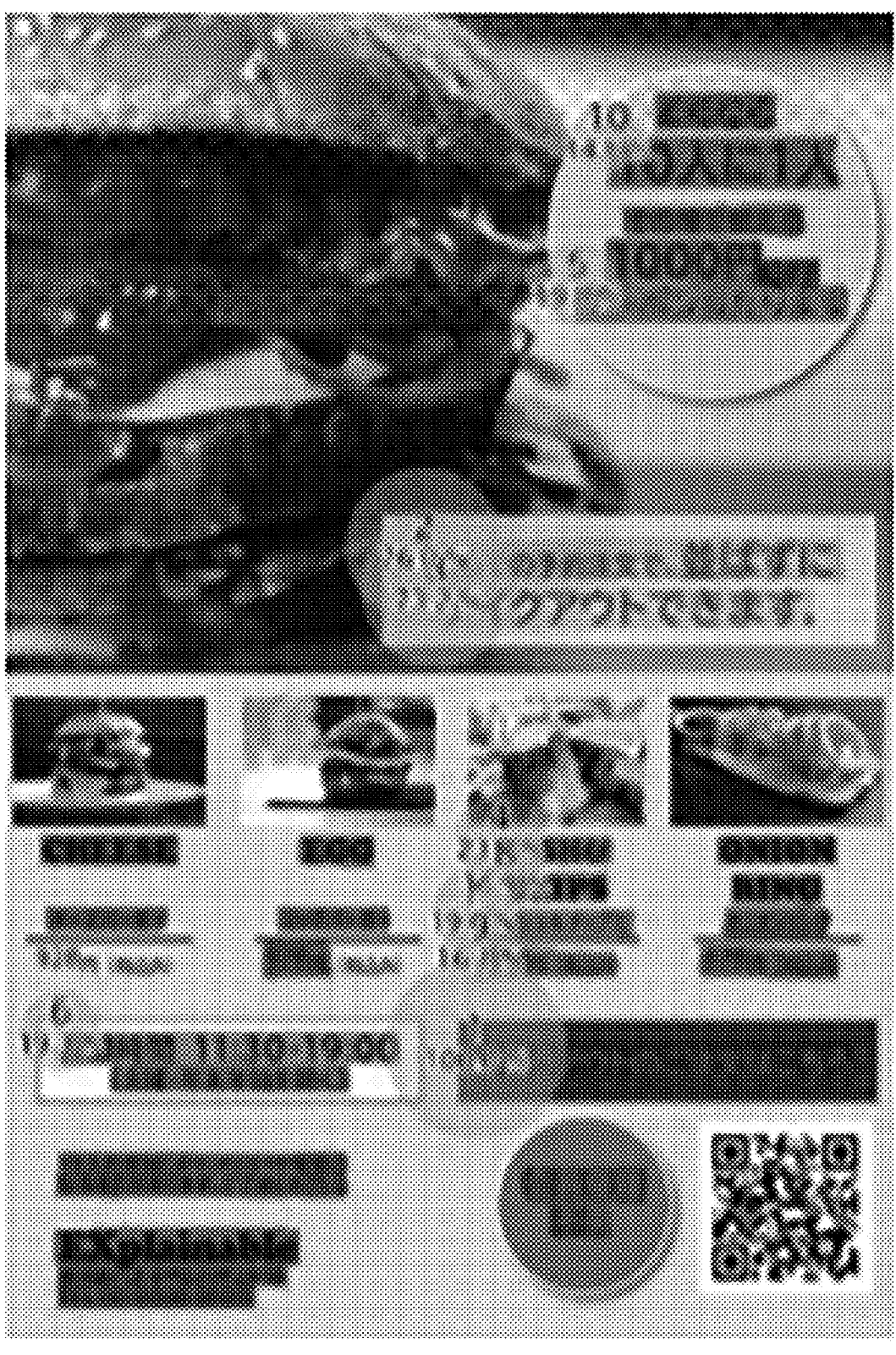
FIG. 7C shows an example of an image where saliencies of characters in the evaluation target image are displayed.

FIG. 7A shows an evaluation target image 14 as an example of the "evaluation target image". FIG. 7B shows an image 15 where the saliency map is displayed on the evaluation target image 14 in an overlaid manner. FIG. 7C shows an image 16 where the saliencies of characters in the evaluation target image 14 are displayed.

As shown in FIG. 7C, the controller 11 assumes that a character portion having the maximum saliency of the characters in the "evaluation target image" as 100% and displays relative values for the other character portions.

Note that as shown in FIG. 7C, a case is described where the saliency of characters is displayed with respect to each character string and where the saliency corresponding to the character string is not constant in this single character string. In this case, an average saliency in the character string may be displayed as the saliency of this character string. The maximum saliency in the character string may be displayed as the saliency of the character string.

As described above, in a case whereby executing the character saliency display process, character strings are compared with each other only specifically in characters in the "evaluation target image", it can be relatively visualized which character is salient.

In this embodiment, as described above, the character area can be automatically set using AI, and the saliency of the character area can be automatically calculated and displayed. Accordingly, the user can effectively evaluate the design related to the characters and perform improvement discussion.

[Method of Applying Saliency Map to Line-of-Sight Prediction Model]

Next, a method of applying a saliency map to a line-of-sight prediction model is described. The line-of-sight prediction model is a model for predicting the line-of-sight trajectory when the observer views the "evaluation target image".

In the line-of-sight prediction model according to the conventional art, the accuracy of the applied saliency map is low. Accordingly, a calculated line-of-sight prediction result does not match an actual human line-of-sight movement in some cases.

Figure 8:
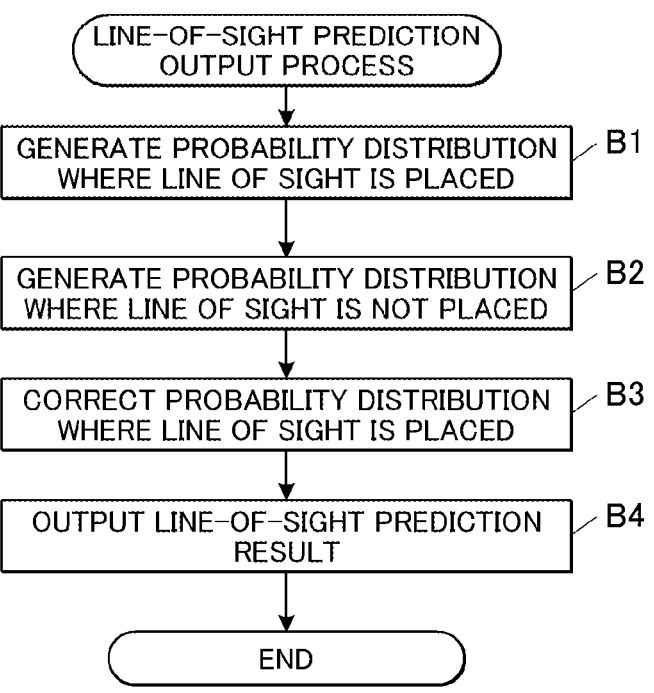
FIG. 8 is a flowchart showing a flow of a line-of-sight prediction output process.

On the other hand, in this embodiment, the controller 11 executes a line-of-sight prediction output process shown in FIG. 8. Accordingly, the controller 11 outputs a line-of-sight prediction result to which the saliency map generated by the saliency analysis process described above is applied.

(Line-of-Sight Prediction Output Process)

Figure 9:
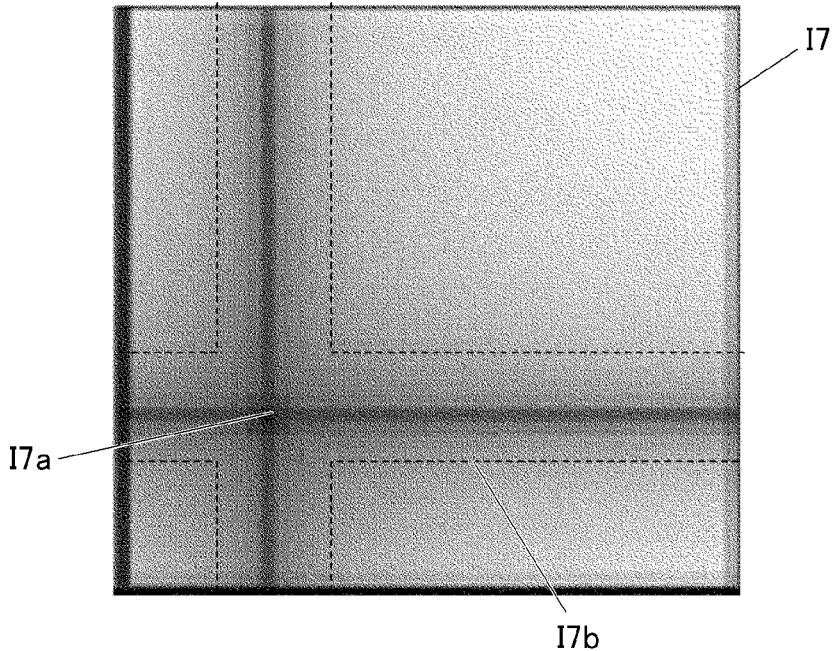
FIG. 9 shows an example of a current position of the line of sight in the evaluation target image, and an area extending in a first direction and a second direction from the current position.

First, the controller 11 generates a first probability distribution indicating a portion with a high probability that the line of sight is directed from the current position in the "evaluation target image" to the portion next (Step B1). Specifically, the controller 11 generates the first probability distribution by combining the saliency map with an area extending from the current position of the line of sight in the "evaluation target image" in a first direction, and in a second direction orthogonal to the first direction. FIG. 9 shows an example of the current position 17*a* of the line of sight in an evaluation target image 17, and an area 17*b* extending in the first direction and the second direction from the current position 17*a*.

In the first probability distribution, an area having a high saliency in the saliency map, and an area extending in the first direction and the second direction from the current position of the line of sight are areas having high probabilities that the line of sight is directed from the current position to the area next.

In Step B1, the first probability distribution becomes a probability distribution weighted based on the saliency at each position in the saliency map generated by the saliency analysis process described above.

That is, based on the saliency at each position in the saliency map, the controller 11 weights the probability that the line of sight in the model for predicting a line-of-sight trajectory when the observer views the "evaluation target image" is directed. Here, the controller 11 functions as a second controller.

Next, the controller 11 generates a second probability distribution indicating a portion with a high probability that the line of sight is not directed from the current position in the "evaluation target image" to the portion next (Step B2). Specifically, the controller 11 generates a second probability distribution assuming an area where the line of sight has once been placed in the "evaluation target image" as a portion having a high probability that the line of sight is not placed.

In the second probability distribution, the degree of a variable indicating the difficulty of attracting the line of sight in the region where the line of sight has once been placed increases with the lapse of time. When the quantity of the variable reaches a predetermined quantity, the line of sight moves to another area.

Next, the controller 11 combines the second probability distribution generated in Step B2 with the first probability distribution generated in Step B1 on a pixel-by-pixel basis in the "evaluation target image". Accordingly, the controller 11 corrects the first probability distribution (Step B3).

Next, the controller 11 outputs the line-of-sight prediction result, based on the first probability distribution corrected in Step B3 (Step B4), and finishes this processing.

Figure 10:
FIG. 10 shows an example of an image displaying a prediction result through a line-of-sight prediction model.

FIG. 10 shows the line-of-sight prediction result output in Step B4.

As shown in FIG. 10, the controller 11 indicates the order where the line of sight is held, in numbers, based on the first probability distribution corrected in Step B3. The controller 11 indicates a time period in which the line of sight is held, with the size of each bubble, based on the second probability distribution.

As described above, by executing the line-of-sight prediction output process, the saliency map that is generated by the saliency analysis process described above and has a higher accuracy can be applied to the line-of-sight prediction model. Accordingly, the prediction accuracy in the line-of-sight prediction model for the "evaluation target image" can be improved.

[Method of Calculating Saliencies for Moving Image]

Next, an example of calculating the saliency for a moving image in a case where the "evaluation target image" is the moving image is described.

In the case where the "evaluation target image" is the moving image, the saliencies are calculated so that each portion where a difference occurs between frame images of the evaluation target moving image as the "evaluation target image" can have a high saliency.

Figure 11:
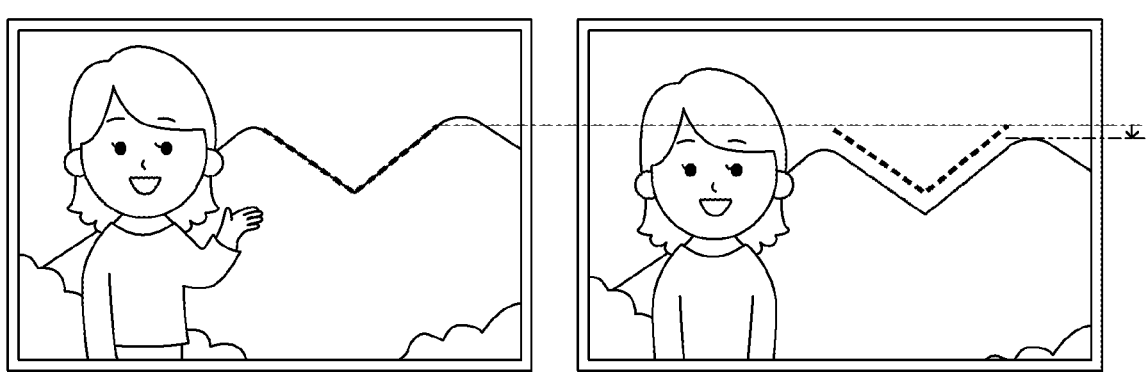
FIG. 11 shows an example of a case where the evaluation target image is a moving image.

A case is described where parallel movement of the entire screen between frame images is caused by a hand shake or the like of a person taking the moving image as shown in FIG. 11.

According to the conventional art, also in this case, the saliency is calculated to be high at the difference between frame images caused by the parallel movement. Accordingly, the background portion that is stationary in actuality is determined to be moved. Consequently, the determination does not match the human actual sensation of saliency, thus causing feeling of strangeness.

On the other hand, in this embodiment, in the feature amount extracting in the saliency analysis process described above, the controller 11 further extracts a motion (movement) in the evaluation target moving image as a low-order image feature amount. That is, the controller 11 extracts a difference occurring between frame images of the evaluation target moving image, as a low-order image feature amount.

Next, the controller 11 extracts an edge portion in each frame image of the evaluation target moving image. The controller 11 then excludes a feature amount indicating a motion in parallel with an edge portion extracted between frame images adjacent to each other, from the group of feature amounts for saliency calculation.

Accordingly, when parallel movement of the entire screen between frame images occurs, the saliency at the difference between the frame images caused by the parallel movement can be prevented from being calculated to be high.

Consequently, in this embodiment, the calculated saliencies for the moving image finely match the actual human sensation of saliency, which prevents the feeling of strangeness described above.

In this embodiment, for the evaluation target moving image shown in FIG. 11, the saliency at the difference in the background between the frame images is not calculated to be high, while the saliency is calculated to be high for an arm of a person moving between the frame images.

[Saliency Map Corresponding to View of Color-Deficient Observer]

Next, reproduction of the view of a color-deficient observer for the "evaluation target image" is described.

For designing, it is important to secure the viewability of the content described in the design image. In this case, it should be noted that even when a color-deficient observer views the design image, the viewability can be secured.

According to the conventional art, the saliency map is generated only with reference to scenery viewed by a person without color deficiency. Consequently, scenery viewed by a color-deficient observer is not considered in generation of the saliency map. A saliency map insufficient for a color-deficient observer is generated.

On the other hand, in this embodiment, the controller 11 edits color information on the "evaluation target image" so as to replicate a view sensed by a predetermined type of color-deficient observer. That is, the controller 11 applies a process of replicating the view of a color-deficient observer, to the "evaluation target image". The predetermined type may be, for example, the P-type, D-type, the T-type and the like.

The controller 11 then executes the saliency analysis process described above, for the "evaluation target image" where the color information is edited, and the saliency map is generated.

Accordingly, in the saliency map generated by the saliency analysis process, a place with prediction that the visual attention is attracted in the "evaluation target image" in a case of observation by a color-deficient observer can be visualized. Consequently, even in the case of observation by the color-deficient observer, it can be easily verified whether the viewability of the content described in the "evaluation target image" is high or not.

[Method of Displaying Saliency Map]

Next, an example of a method of displaying the saliency map is described.

In the saliency analysis system according to the conventional art, an "evaluation target image" as an input image into the saliency analysis process, and an output saliency map are mainly separately displayed. In this case, to determine where an area salient in the saliency map is in the "evaluation target image", the following operation is required. Specifically, the operation is an operation of overlaying the saliency map on the "evaluation target image" by the user's manual operation. Consequently, the efficiency is low.

On the other hand, in this embodiment, as shown in FIG. 7B, the controller 11 displays the saliency map indicating the magnitude of the saliency as a heat map, on the "evaluation target image", in an overlaid manner. Here, the controller 11 functions as a display controller.

Note that the "evaluation target image" in this case may be a still image or a moving image.

Consequently, it can be easily recognized where the salient area in the saliency map is in the "evaluation target image". That is, the result of determining where the salient area on the saliency map is in the "evaluation target image" can be effectively visualized in a more understandable manner.

Advantageous Effects

As described above, the saliency analysis system 100 (information processing apparatus 1) according to this embodiment includes: the input receiver 15 that receives the "evaluation target image"; and the controller 11 that serves as the feature amount extractor of extracting low-order image feature amounts and high-order image feature amounts from the "evaluation target image", and functions as the calculator of calculating the saliencies in the image, based on the low-order image feature amounts and the high-order image feature amounts.

Accordingly, the saliencies (line-of-sight fixation) of the image that are intended to be evaluated can be evaluated and analyzed in consideration not only of the low-order image feature amounts, such as the color, luminance, and bearing, but also of the high-order image feature amounts, such as the processing fluency, and the position bias.

Consequently, the saliencies (line-of-sight fixation) can be accurately evaluated, and the line-of-sight predictability (line-of-sight guidance) having conventionally been achieved using deep learning can also be analyzed. The saliencies including the line-of-sight predictability are thus evaluated without using deep learning. Accordingly, not only the evaluation result of the saliencies (line-of-sight fixation) but also which element and factor (image feature amount) affects derivation of the result can be identified. Accordingly, the process of evaluation does not become a black box.

Such achievement of the system capable of indicating the process of evaluation can obtain the evaluation result easily understandable for the evaluator, such as a designer. That is, the evaluator can know not only presence or absence of the saliency, but also which element and component (image feature amount) contribute to determination of presence or absence of the saliency. Accordingly, the accuracy of description for the evaluator is improved.

In this embodiment, the controller 11 is provided that serves as the area setter of setting the "determination area" in the "evaluation target image", and as the determiner of determining the contribution to the saliency of each image feature amount in the determination area.

Accordingly, about the portion having the saliency intended to be particularly analyzed in the "evaluation target image", it is indicated which image feature amount is determined to affect the saliency, and how much saliency is determined to be present.

The "determination area" is freely designated by the evaluator. Accordingly, the analysis result can be obtained about the portion having the saliency of which evaluation is particularly intended to be known.

In this embodiment, the controller 11 also serves as the improvement proposer that proposes an improvement about the saliencies in accordance with the value of the image feature amount.

As for the saliency improvement, the evaluator can grasp how the portion having saliency intended to be improved (i.e., the portion intended to be salient) can be made more salient than in the present state and correct the design so as to achieve a desired saliency. Thus, the designer and the like can be supported. In particular, the saliency including the line-of-sight predictability (line-of-sight guidance) can be exhibited. Accordingly, the design improvement directionality can be presented for the evaluator, such as a designer.

In this embodiment, the high-order image feature amount includes at least any of the position bias, and the processing fluency.

Accordingly, the human spiritual and psychological tendencies, the line-of-sight movement tendency and the like, which are regarded to impact on a person viewing an image, and the degree of visual fixation (conspicuity and saliency), can be reflected in saliency analysis. Consequently, without use of the conventional deep learning, the saliency including the line-of-sight predictability (line-of-sight guidance) can be exhibited.

In this embodiment, the degree of the processing fluency includes what is determined by at least one of the complexity, design density, and spatial frequency.

Accordingly, the spiritual tendency that a random and complex location in the "evaluation target image", and conversely a location with a small amount of information is less likely to attract visual attention and to achieve line-of-sight concentration, can be reflected in saliency analysis.

In this embodiment, the low-order image feature amounts encompass at least any of the color, luminance distribution, bearing (the direction and shape of an edge, etc.), contrast, face, font, and motion.

Accordingly, the basic image feature amounts, such as the color, and the luminance distribution, can be reflected in saliency analysis.

The saliency analysis system 100 according to this embodiment includes a generator (controller 11) that generates each feature amount saliency map indicating the saliencies in the image calculated by the calculator (controller 11), based on the image feature amount extracted for the corresponding type of the image feature amount by the feature amount extractor (controller 11), and generates the saliency map that integrally includes all the feature amount saliency maps.

Thus, the more accurate saliency map in consideration of the low-order and high-order image feature amounts can be generated.

In the saliency analysis system 100 according to this embodiment, the generator (controller 11) generates the feature amount saliency map using the L*a*b* color space.

Thus, the values of luminance contrast and color contrast extracted from the "evaluation target image" can be represented using the brightness difference or the color difference, which are suitable for the human sensation. Consequently, the saliencies indicated by the finally obtained saliency map can finely match the human sensation.

In the saliency analysis system 100 according to this embodiment, the generator (controller 11) sets a predetermined gradation in a transparent area residing in the evaluation target image and generates the saliency map.

Thus, even when a transparent area is included in the "evaluation target image", the saliency map indicating appropriate saliencies can be generated.

The saliency analysis system 100 according to this embodiment includes a first controller (controller 11) that determines the saliency in the character area in the evaluation target image, based on the saliency map generated by the generator (controller 11).

Thus, in a case where character strings are compared with each other only specifically in characters in the "evaluation target image", it can be relatively visualized which character is salient.

The saliency analysis system 100 according to this embodiment includes a second controller (controller 11) that weights a probability that the line of sight in a model for predicting a line-of-sight trajectory when the observer views the evaluation target image is directed, based on the saliency at each position in the saliency map.

Thus, the more accurate saliency map generated by the saliency analysis process can be applied to the line-of-sight prediction model. Consequently, the prediction accuracy in the line-of-sight prediction model for the "evaluation target image" can be improved.

In the saliency analysis system 100 according to this embodiment, based on the saliency map and on an area extending from a current position of the line of sight in the evaluation target image in a first direction and in a second direction orthogonal to the first direction, the second controller (controller 11) generates a first probability distribution indicating a portion with a high probability that the line of sight is directed from the current position in the evaluation target image to the portion next, generates a second probability distribution indicating a portion with a high probability that the line of sight is not directed from the current position in the evaluation target image to the portion next, and corrects the first probability distribution by composing a second probability distribution from the first probability distribution on a pixel-by-pixel basis in the evaluation target image.

Thus, the more accurate saliency map generated by the saliency analysis process can be applied to the line-of-sight prediction model. Consequently, the prediction accuracy in the line-of-sight prediction model for the "evaluation target image" can be improved.

In the saliency analysis system 100 according to this embodiment, the feature amount extractor (controller 11) extracts a motion as the image feature amount for the moving image, which is the evaluation target image, and the generator (controller 11) excludes the image feature amount indicating a motion that is extracted by the feature amount extractor between frame images adjacent to each other in the moving image and is in parallel with the edge portions of the frame images, and generates the saliency map.

Accordingly, when parallel movement of the entire screen between frame images occurs, the saliency at the difference between the frame images caused by the parallel movement can be prevented from being calculated to be high. Consequently, the saliency of the moving image finely matches the human sensation of actual saliency.

In the saliency analysis system 100 according to this embodiment, the generator (controller 11) performs a process of replicating the view of a color-deficient observer in the evaluation target image and generates the saliency map.

Consequently, the place with prediction that the visual attention is attracted when the color-deficient observer observes the "evaluation target image" can be visualized by the saliency map. Consequently, even in the case of observation of the "evaluation target image" by the color-deficient observer, it can be easily verified whether the viewability of the content described in the "evaluation target image" is high or not.

The saliency analysis system 100 according to this embodiment includes a display controller (controller 11) that displays the saliency map on the evaluation target image in an overlaid manner.

Consequently, it can be easily recognized where the salient area in the saliency map is in the "evaluation target image". That is, the result of determining where the salient area on the saliency map is in the "evaluation target image" can be effectively visualized in a more understandable manner.

Modifications

Note that although an embodiment of the present invention has been described above, the present invention is not limited to such an embodiment, and obviously various modifications are possible within a scope that does not depart from the gist of the present invention.

For example, in the embodiment described above, the example is described where the controller 11 of the single information processing apparatus 1 functions as the feature amount extractor, the calculator, the area setter, the determiner, and the improvement proposer. However, what functions as the feature amount extractor, the calculator, the area setter, the determiner, and the improvement proposer are not limited to the controller 11 of the information processing apparatus 1. A controller of another computer may be responsible for all or some of these functions.

Furthermore, according to the embodiment described above, the example is described where the controller 11 of the single information processing apparatus 1 functions as the generator, the first controller, the second controller, and the display controller. What functions as the generator, the first controller, the second controller, and the display controller are not limited to the controller 11 of the information processing apparatus 1. A controller of another computer may be responsible for all or some of these functions.

In this case, the saliency analysis system is configured including the computer responsible for these functions.

According to this embodiment, the example is described where the processing fluency (complexity) is quantified in the fractal dimension. However, the method of quantifying and evaluating the processing fluency (complexity) is not limited to this. Various methods may be used.

According to this embodiment, the color, luminance distribution, and bearing (the direction and shape of the edge, etc.), contrast, face, font, and motion are described as examples of the low-order image feature amounts, and the processing fluency, and the position bias are described as the examples of the high-order image feature amounts. However, the image feature amounts affecting analysis and determination in the saliency analysis system are not limited to them. Various other elements may be included.

By determining the saliencies in broad consideration of elements affecting the line-of-sight concentration, movement and the like, a further accurate analysis result can be obtained.

Note that the present invention obviously is not limited to the above embodiment, modifications, and the like, and alterations can be made, as appropriate, without departing from the gist of the present invention.

Although embodiments of the present invention have been described and illustrated in detail, the disclosed embodiments are made for purposes of illustration and example only and not limitation. The scope of the present invention should be interpreted by terms of the appended claims.

The invention claimed is:

1. A saliency analysis system, comprising:
an input receiver that receives an evaluation target image; and
a hardware processor, wherein
the hardware processor extracts low-order image feature amounts and high-order image feature amounts, from the evaluation target image, and
calculates saliencies in the image, based on the low-order image feature amounts and the high-order image feature amounts;
wherein the high-order image feature amounts includes a processing fluency;
wherein a degree of the processing fluency includes what is determined by at least one of a complexity, a design density, and a spatial frequency; and
wherein the low-order image feature amounts include at least one of a color, a luminance distribution, a bearing, a contrast, a face, a font, and a motion.

2. The saliency analysis system according to claim 1, wherein the hardware processor:
sets a determination area in the evaluation target image; and
determines a contribution of each of the image feature amounts to the saliencies in the determination area, and the set determination area is an area freely designated by an evaluator.

3. The saliency analysis system according to claim 1, wherein the hardware processor proposes an improvement regarding the saliencies depending on values of the image feature amounts.

4. The saliency analysis system according to claim 1, wherein the hardware processor generates feature amount saliency maps indicating the saliencies in the image that are calculated based on the extracted image feature amounts, respectively for types of the image feature amounts, and generates a saliency map that integrally includes all the saliency maps.

5. The saliency analysis system according to claim 4, wherein the hardware processor generates the feature amount saliency maps using an L*a*b* color space.

6. The saliency analysis system according to claim 4, wherein the hardware processor sets a predetermined gradation in a transparent area residing in the evaluation target image and generates the saliency map.

7. The saliency analysis system according to claim 4, wherein the hardware processor determines the saliencies in a character area in the evaluation target image, based on the generated saliency map.

8. The saliency analysis system according to claim 4, wherein based on the saliency at each position in the saliency map, the hardware processor weights a probability that a line of sight in a model for predicting a line-of-sight trajectory when an observer views the evaluation target image is directed.

9. The saliency analysis system according to claim 8, wherein based on the saliency map and on an area extending from a current position of the line of sight in the evaluation target image in a first direction and in a second direction orthogonal to the first direction, the hardware processor generates a first probability distribution indicating a portion with a high probability that the line of sight is directed from the current position in the evaluation target image to the portion next, generates a second probability distribution indicating a portion with a high probability that the line of sight is not directed from the current position in the evaluation target image to the portion next, and corrects the first probability distribution by composing a second probability distribution from the first probability distribution on a pixel-by-pixel basis in the evaluation target image.

10. The saliency analysis system according to claim 4, wherein the hardware processor:
extracts a motion as the image feature amounts for a moving image as the evaluation target image; and
excludes each image feature amount indicating a motion that is extracted between frame images adjacent to each other in the moving image and is in parallel with an edge portion of the frame images and generates the saliency map.

11. The saliency analysis system according to claim 4, wherein the hardware processor applies a process of replicating a view of a color-deficient observer, to the evaluation target image, and generates the saliency map.

12. The saliency analysis system according to claim 4, wherein the hardware processor displays the saliency map on the evaluation target image in an overlaid manner.

13. A saliency analysis method, comprising:
extracting low-order image feature amounts and high-order image feature amounts, from an input evaluation target image, and
calculating saliencies in the image, based on the low-order image feature amounts and the high-order image feature amounts;
wherein the high-order image feature amounts includes a processing fluency;
wherein a degree of the processing fluency includes what is determined by at least one of a complexity, a design density, and a spatial frequency; and
wherein the low-order image feature amounts include at least one of a color, a luminance distribution, a bearing, a contrast, a face, a font, and a motion.

14. A non-transitory computer-readable recording medium including a program causing a computer to achieve:
extracting low-order image feature amounts and high-order image feature amounts, from an input evaluation target image; and
calculating saliencies in the image, based on the low-order image feature amounts and the high-order image feature amounts;
wherein the high-order image feature amounts includes a processing fluency;

wherein a degree of the processing fluency includes what is determined by at least one of a complexity, a design density, and a spatial frequency; and wherein the low-order image feature amounts include at least one of a color, a luminance distribution, a bearing, a contrast, a face, a font, and a motion.

\* \* \* \* \*